United States Patent

Koester et al.

[15] 3,670,260

[45] June 13, 1972

[54] CONTROLLED OPTICAL BEAM FORMING DEVICE

[72] Inventors: Charles J. Koester, Sudbury; Charles Hermas Swope, Holliston, both of Mass.

[73] Assignee: American Optical Corporation, Southbridge, Mass.

[22] Filed: May 15, 1970

[21] Appl. No.: 37,576

[52] U.S. Cl. ............................331/94.5, 350/167, 350/286, 128/395
[51] Int. Cl. ......................................G02b 27/00, H01s 3/05
[58] Field of Search ................350/167, 286; 240/41.3, 41.4; 331/94.5; 128/393, 395

[56] References Cited

UNITED STATES PATENTS

| 1,236,137 | 8/1917 | Bastow | 240/41.4 D |
| 1,243,652 | 10/1917 | Casey | 240/41.4 D |
| 3,302,016 | 1/1967 | Larraburu | 240/41.3 |
| 2,604,002 | 6/1952 | Wengel | 350/167 |
| 3,467,099 | 9/1969 | Lotmar | 128/395 X |

OTHER PUBLICATIONS

Kremen, " Prism Deflector for Laser Machining," IBM Tech. Discl. Bul. Vol. 8, No. 6, Nov. 1965, p. 882
Kakichashvili et al., " JETP Letters," Vol. 5, May 15, 1967, pp. 305- 307

*Primary Examiner*—Ronald L. Wibert
*Assistant Examiner*—R. J. Webster
*Attorney*—William C. Nealon, Noble S. Williams, Robert J. Bird and Bernard L. Sweeney

[57] ABSTRACT

A controlled optical beam forming device distributes the light from a collimated source such as a laser within a controlled solid pattern with any desired relative intensity distribution. The device is formed of two optical elements. The first element apportions the beam into a plurality of extensive zones. The second element diffuses the light in the zones to form a beam having the desired form and distribution.

24 Claims, 20 Drawing Figures

INVENTORS
CHARLES J. KOESTER
CHARLES HERMAS SWOPE
BY
AGENT

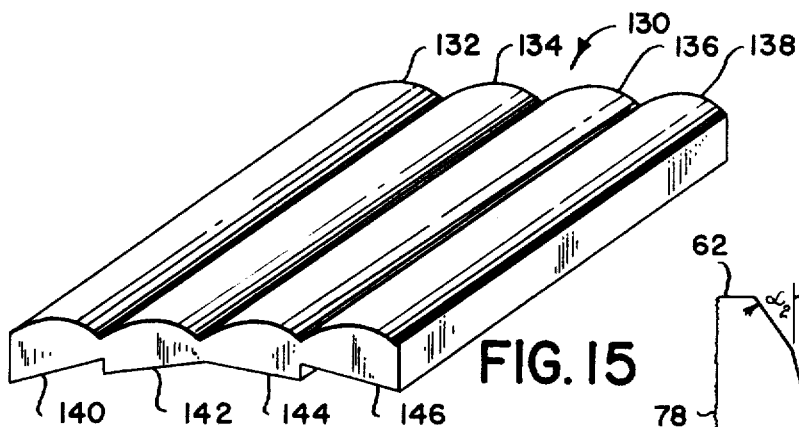
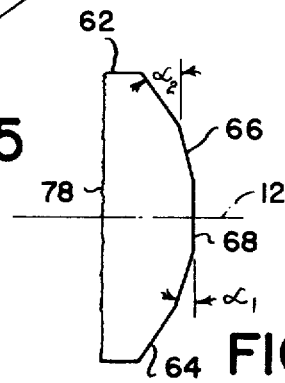
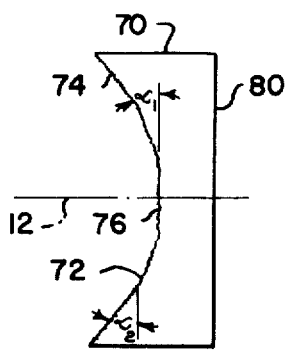
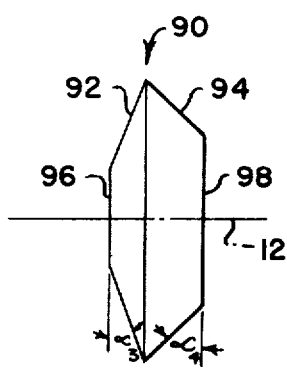
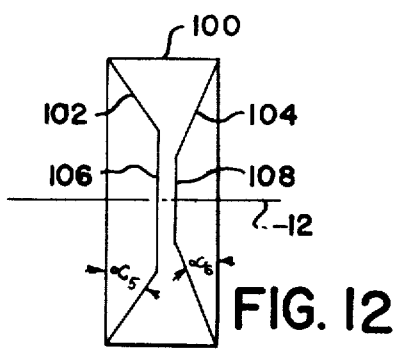
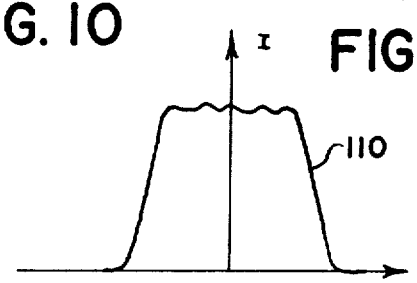
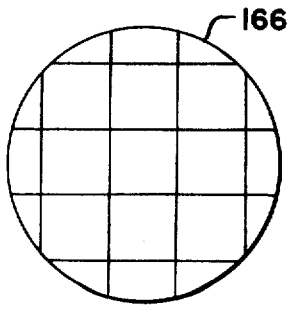
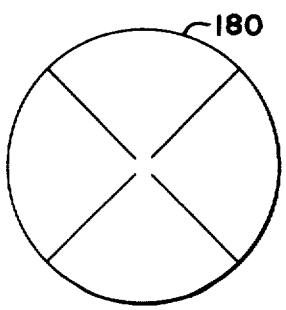
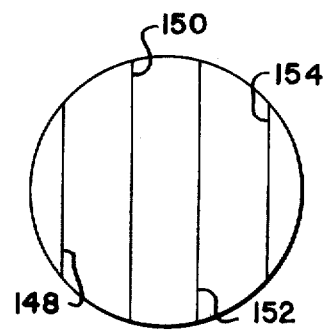
INVENTORS
CHARLES J. KOESTER
CHARLES HERMAS SWOPE
BY
AGENT

3,670,260

CONTROLLED OPTICAL BEAM FORMING DEVICE

BACKGROUND OF THE INVENTION

This invention is related to improvements in optical diffusing devices and is more particularly concerned with such devices which are employed with laser radiation.

In recent years, the laser has become one of the most important sources of radiation. It emits a beam which has both temporal and spatial coherence. Temporal coherence refers to the monochromaticity of the source. Spatial coherence refers to the light either emanating from a point source or being focusable to a very small point. In addition, the output is highly collimated and generally very intense.

In many cases not all of these characteristics are beneficial. For example, in an optical system for use with a laser, a high degree of spatial coherence can be very harmful. At any point in the system where the laser rays are brought to a focus, a "hot spot" is created. If one of these hot spots falls on or in an optical element, that element may be damaged or destroyed by the very high energy density at that point.

Many efforts have been made to alleviate this problem. Some include the insertion of a diffuser into the laser beam. Theoretically this is a good solution; however, there are numerous practical disadvantages. To achieve a reasonable diffusion of the light with an ordinary diffuser, the efficiency of the system must be seriously degraded. Since lasers are inherently somewhat inefficient, this can represent a large increase in cost and complexity in order to return to the previous output intensity levels. Also, the ground or etched glass diffuser has a gradual decline of intensity with angle so that control of the relative intensity across the output beam is lost.

A specific occurrence of this problem is in the process of photocoagulation. The process called photocoagulation has been developed primarily to treat or overcome retinal detachments in the human eye by fusing the retina of the eye to the choroid. However, photocoagulation can also be used to destroy tumors, to prevent the spread of disease, and in many other ways known to the medical profession. As applied to chorioretinal coagulation, the photocoagulation process calls for the application of an intense beam of radiant energy to the cornea of an eye in such a manner that the energy is focussed on a selected part of the retina by the refractive elements of the eye. In this way, the retina and choroid can be coagulated or congealed together at the focal point of the radiant energy beam to overcome the retinal detachment. Later, scar tissue forms at the point of photocoagulation to form a bond between the retina and the choroid which is generally stronger than the original tissue. This is what is meant by "fusing" the retina to the choroid.

An apparatus for performing photocoagulation using a laser is described in U.S. Pat. No. 3,348,547 by A. J. Kavanagh, et al, which is assigned to the same assignee as is the present application. The beam of radiant energy used in photocoagulation must be very intense and must be precisely focussed only onto the retina in order to achieve the desired coagulation of the retina in a very brief period of time before other parts of the eye become overheated by the radiant energy. On the other hand, as photocoagulation destroys the tissue of the eye in the area of the eye being coagulated, the effective photocoagulation apparatus must also be adapted to focus that intense energy only upon a carefully sized and selected part of the retina. However, the size of that spot is variable and is limited by the size of the beam which can pass through the pupil of the patient's eye.

As has been stated previously, the intensity of the laser beam can seriously damage or destroy elements in which an undesired hot spot is present. This is especially important in the laser photocoagulation apparatus; if the laser beam were to come to a focus in any other part of the eye, the portion would be very seriously injured and the patient would likely be permanently blinded. Therefore, a diffusing device is preferable in a photocoagulator to a focussing device because the danger of the undesirable secondary hot spots is eliminated.

Similarly, the edge of the beam must not be allowed to encounter the iris of the eye as a severe burn could easily occur which could again seriously affect the patient's sight. Hence, the beam utilized must have a carefully controlled intensity profile across the beam and the edges must be sharply defined.

In addition, to perform effectively, the intensity of the energy beam focussed on the retina of the patient's eye should be as uniform as possible over the entire area focussed upon. Failure to provide uniform intensity manifests itself in either the overheating and burning of the spots where the intensity is highest or the incomplete fusion because some areas do not receive sufficient energy to cause coagulation. Also, because of the generally low efficiency of the laser as an energy source, it is highly desirable to achieve the uniformity of beam intensity while utilizing a very high percentage of the energy emitted by the laser source.

Another area in which lasers are being prominently used is as a "torch" for welding or cutting. Again a preselected area is to be irradiated with a substantially uniform energy density or in a non-uniform, but predetermined energy profile. The spatial coherence is unimportant; however, the apparatus must be protected against hot spots in the optical system which could destroy or damage components in the system.

SUMMARY OF THE INVENTION

Accordingly, it is an object of the present invention to provide a controlled optical beam forming device to avoid hot spots in a laser system when the spatial coherence of the laser beam is unnecessary.

Another object is to redistribute the light from a simple collimated source into a controlled output beam having a desired intensity profile.

Another object is to provide a controlled optical beam forming device for uniformly distributing collimated light within a controlled solid angle.

A further object is to provide such a diffuser which may be utilized in a laser photocoagulator.

A still further object is to provide such a diffuser which is simple in construction and economical to produce.

Briefly, the invention in its broadest aspect comprises the combination of an optical member which redistributes the light from a collimated source into a series of extensive zones, and means for diffusing the light in the zones to form an emergent beam having a controlled intensity and divergency distribution.

Further objects, advantages, and features of the invention will be apparent in the arrangement and construction of the constituent parts in detail as set forth in the following specification taken together with accompanying drawing.

DESCRIPTION OF THE DRAWING

In the drawing,

FIGS. 9 through 12 are schematic representations of optical elements according to the invention which have two conical surfaces, FIG. 13 is a graphical representation of the distribution of the light intensity at the field stop in the apparatus of FIG. 1 when any of the optical members shown in FIGS. 9 through 12 are substituted into the apparatus of FIG. 1, FIGS. 15 through 17 are perspective views showing other forms of the invention in which cylindrical lenses are utilized to redistribute the collimated light, and FIGS. 18 through 20 are graphical representations of the intensity in the output beam at the field stop in the apparatus of FIG. 1 with the diffusing member removed, FIGS. 18 through 20 being associated with FIGS. 15 through 17 respectively.

DETAILED DESCRIPTION OF THE PREFERRED EMBODIMENTS

Figure 1:
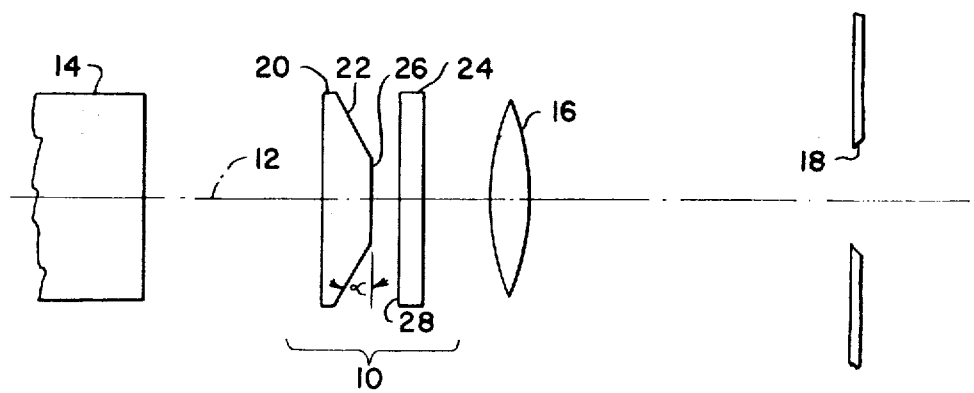
FIG. 1 is a schematic optical diagram of the portion of a laser photocoagulator in which the present invention is embodied.

In referring to the various figures during the following description, like reference numerals will refer to identical parts of the apparatus.

Referring now to FIG. 1, there is shown a schematic optical diagram of the portion of a laser photocoagulator in which the present invention may be embodied. The operation of the laser photocoagulator is explained in the aforementioned patent. This device will be used as a vehicle for describing the operation of the invention; however, it should be noted that the laser photocoagulator is only exemplary of the various devices in which the invention may be utilized.

The controlled diffuser, which is indicated generally by the reference numeral 10, is aligned on the optical axis 12 of the laser 14. In the laser photocoagulator, a lens 16 is arranged to project light from the diffuser 10 through a field stop 18 which is also aligned on the optical axis 12. Generally, the diffuser 10 is preferably located at the first principal focus of the lens 16 so that the lens projects an image of the illuminated diffuser 10 through the field stop 18 to infinity; however, this location is not necessary as the device according to the invention will function when placed anywhere in the apparatus where collimated light is present. In addition, the field stop 18 is located at the second principal focus of the lens 16 and the diffusing properties of the diffuser 10 are selected in accordance with the size of the field stop 18, so that the lens 16 images the far field of the diffuser 10 at the field stop 18 to just fill the field stop aperture. For the diffusers commonly used, this results in a maximum amount of light from the laser 14 being directed through the field stop 18.

The beam which is emitted by the laser 14 is both spatially and temporally coherent, and this can cause hot spots to be formed in the optical system. In many applications, these hot spots may be eliminated by destroying or partially destroying the spatial coherence of the beam. Generally this is done by diffusing the beam with a ground or etched glass diffuser. Furthermore, a ground or etched glass diffuser provides a bell-curve distribution of intensity; therefore, to acquire a relatively uniform intensity over the field stop aperture, it is necessary to utilize a field stop which passes only a small central portion of the energy distribution. Hence, only a small portion of the light emitted by the laser may be actually utilized. This can greatly influence the cost of the apparatus because the laser is certainly a major component and with its generally low efficiency, a major increase in output capacity to overcome these losses can be very expensive.

Figure 2:
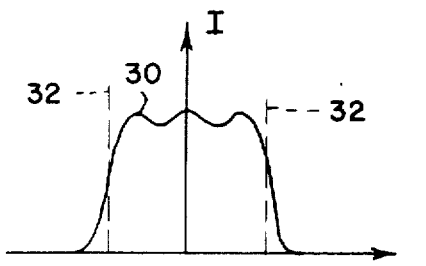
FIG. 2 is a graphical representation of the distribution of light intensity at the field stop in the apparatus shown in FIG. 1, FIGS. 3 through 8 are a series of schematic representations which are useful in understanding the invention; each of the figures includes (a) an optical schematic diagram showing the elements, (b) a graphical representation of the cross section of the beam at the field stop, and (c) a graphical representation of the intensity at the field stop versus radial position in the beam.

This embodiment of the controlled diffuser 10 was invented to overcome these difficulties by providing a substantially uniform distribution of light within a controlled solid angle. The diffuser is comprised of an optical member 20 which has a truncated conical surface 22 for apportioning the collimated beam of light from the laser 14 into a plurality of concentric zones within the solid angle and a means 24 for diffusing the intensities of the zones to form the desired distribution of light. In this embodiment, the member 20 is a truncated conical element having a single conical surface 22 and a central planar surface 26, the cone angle of the conical surface being designated $\alpha$. The means 24 for diffusing the intensities is a glass member having an etched surface 28. This apparatus provides an intensity distribution similar to that shown by curve 30 in FIG. 2. This graphical representation of the intensity versus the radial position in the beam is at the field stop aperture of the apparatus of FIG. 1. The dotted lines 32 denote the approximate locations of the edge of the field stop 18 and show the substantial uniformity of the beam intensity provided by the invention with the attendant low loss of intensity at the edge of the field stop aperture.

To explain the operation of the invention, reference will now be made to Figures 3 through 8 successively. Each of these figures includes three subfigures; (a) an optical schematic diagram which sets forth the optical elements included; (b) a graphical representation of the cross section of the beam at the field stop such as would be seen if a screen were inserted in the plane of the field stop; and (c) a graphical representation of the intensity of the beam versus radial position in the beam at the field stop as in FIG. 2.

Figure 3:
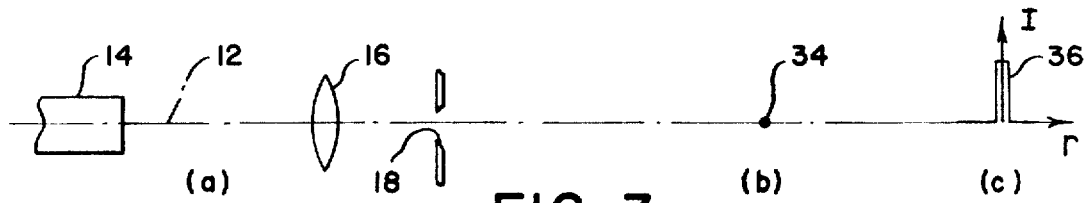
Figure 4:
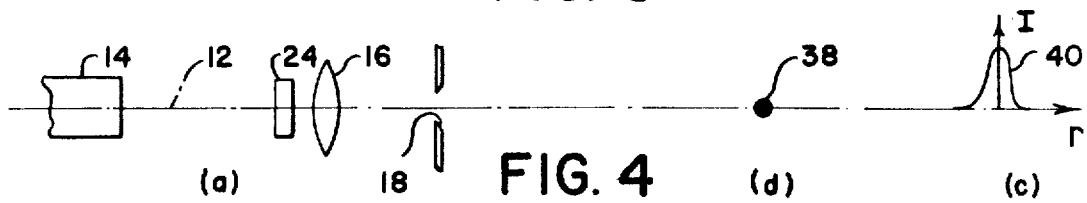
Figure 5:
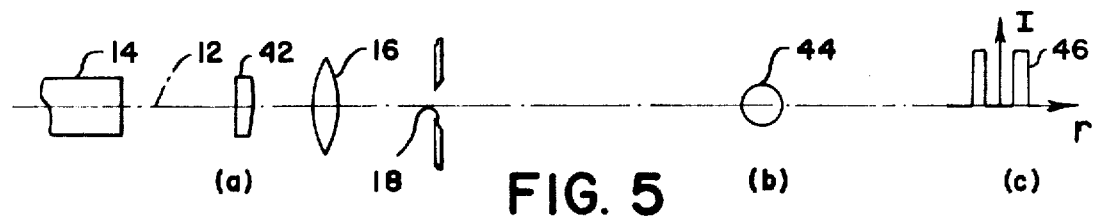
Figure 6:
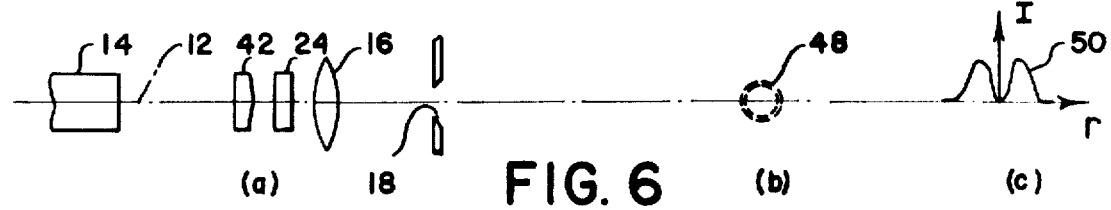
Figure 7:
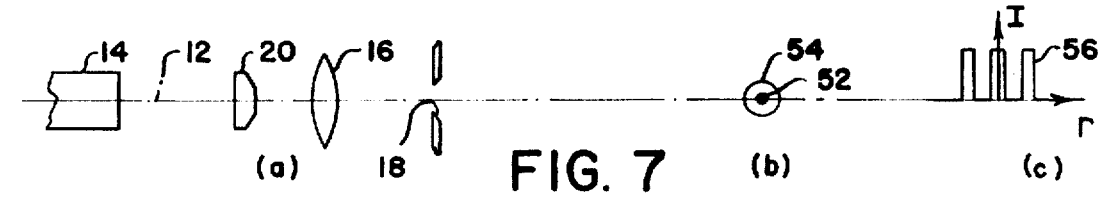
Figure 8:
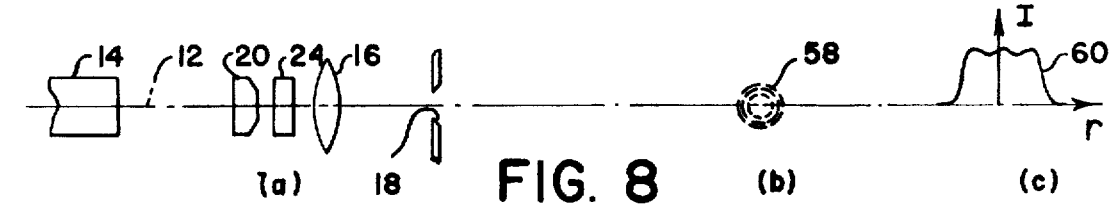

Referring now to FIG. 3 in general, and FIG. 3(a) in particular, it can be seen that with the controlled diffuser 10 removed from the apparatus, leaving only the laser 14, the lens 16 and the field stop 18 aligned on the optical axis 12, that a very small intense spot 34 of light is found at the field stop 18. The intensity distribution curve 36 in FIG. 3(c) is characterized by its sharp rising and falling edges. It should be noted at this time that the graphical representations are idealistic in that no cross-sectional irregularities in beam intensity are shown as they would only tend to confuse the drawings. However, the diffuser described provides an improved means of coping with and largely eliminating these irregularities.

In FIG. 4(a), a diffuser 24 is installed in the optical system. This is the apparatus described in the above-referenced patent. As can be seen in FIGS. 4(b) and 4(c), the spot of light 38 at the field stop 18 is broadened and the associated intensity curve 40 acquires the familiar bell-curve shape; but which does not uniformly fill the field stop aperture.

In FIG. 5(a), the diffuser is replaced by a full cone optical member 42. The cone 42 causes the light to be distributed in a sharp ring as shown in FIG. 5(b). The intensity distribution and the sharpness of the ring are shown by curve 46 in FIG. 5(c).

In FIG. 6(a), the diffuser 24 is again in place along with the conical member 42. The diffuser 24 breaks the sharpness of the light to give a diffuse ring 48 having an intensity distribution as shown by curve 50 in FIGS. 6(b) and 6(c) respectively.

If the diffuser and conical member are removed and replaced by a truncated conical optical member 20 as shown in FIG. 7(a), then the laser light is apportioned into concentric zones 52 and 54 as shown in FIG. 7(b). These zones are again very sharp as shown by curve 56 in FIG. 7(c). The light included in zone 52 passes through member 20 by way of the planar portion 26 of the truncated surface. The light which is included in zone 54 passes through the conical surface 22 and emerges as a diverging annular beam around the first zone. The divergence of the light in zone 54 is a function of the optical properties of the member 20 and the surrounding medium and on the cone angle $\alpha$ of the truncated optical member.

Referring finally to FIG. 8(a), it can be seen that the diffusing plate 24 has been reinserted in the optical system to return to the configuration shown in FIG. 1. As can be seen from the series of diffused rings 58 in FIG. 8(b), and the curve 60 in FIG. 8(c), the intensity is now quite uniform over a great percentage of the beam width.

Therefore, it has been shown that a uniform distribution of light within a prescribed solid angle can be achieved. The importance of filling the solid angle can be seen by noting that if the solid angle is not filled or is overfilled, the lens 16 will cause the field stop aperture to be either incompletely illuminated or valuable light wasted. In the present invention, however, with precise control of the solid angle possible, the lens 16 can be designed such that the field stop aperture is just filled by the uniform light field with a very small amount of wasted energy.

Although the present invention is being described in the context of a laser photocoagulator, it is by no means usable only in that apparatus. Any source of collimated light may be utilized. In addition, the succeeding elements in the optical path may be widely varied within the scope of the invention. Also, it should be noted at this time that although the elements are generally referred to as being formed of glass, it is within the purview of the invention to utilize any optical materials. In fact, in some forms, plastic elements may be preferable.

There are of course many variations which can be made within the scope of the invention. For example, the truncated conical member can be formed of a plurality of coaxial truncated conical sections each having successively smaller cone angles and having the major diameter of each section equal to the minor diameter of the preceeding section. This type of diffuser is useful where the prescribed solid angle is large or the uniformity of the light distribution within the solid angle must be improved beyond that afforded by the diffuser of FIG. 1. A diffuser of this type is shown in FIG. 9. This particular embodiment of the invention is generally indicated by reference numeral 62. One surface of diffuser 61 is defined by a pair of coaxial truncated conical sections whose exposed conical surfaces are indicated by reference numerals 64 and 66. The resulting exposed planar portion of the smaller truncated conical section is designated 68. The cone angles $\alpha_1$ and $\alpha_2$ which are associated with the respective conical sections defined by surfaces 64 and 66 are progressively smaller.

A similar type of optical member 70 is shown in FIG. 10; however, the effective surface is concave rather than convex as in FIG. 9. As can be seen, the cone angles $\alpha_1$ and $\alpha_2$ associated with the refractive surfaces 72 and 74 respectively, remain constant. A central planar portion 76 completes the truncated conical surface of member 70.

In addition, convex member 62 includes the diffusing means as an etched rear surface 78, whereas the rear surface 80 of the concave member 70 is clear. However, the truncated conical front surface of member 70 is etched to provide the diffusing means. Furthermore, the etched surface of either of those members could be reversed, so long as a surface of the element is etched, the member can perform satisfactorily.

Another optical member 90 is shown in FIG. 11 and incorporates the teaching of the present invention. The optical member 90 is not shown with an associated diffusing means; however, it should be understood that any of the previously noted diffusing means may be satisfactorily combined with this optical member. The optical member 90 includes two convex truncated conical surfaces 92 and 94 which have respective cone angles $\alpha_3$ and $\alpha_4$ associated therewith. The planar areas 96 and 98 are associated with conical surfaces 92 and 94 respectively.

The optical member 100 which is shown in FIG. 12 is similar to optical member 90 except that the two truncated conical surfaces 102 and 104 are concave within the optical member 100. Associated with the conical surfaces 102 and 104 are the respective cone angles $\alpha_5$ and $\alpha_6$ and the respective central planar areas 106 and 108.

Referring now to FIG. 13 which shows an intensity distribution curve 110 which applies to any of the embodiments shown in FIGS. 9 through 12. As can be seen, the resulting distribution is more uniform than that provided by a member composed of only a single truncated conical section. Obviously, it can be seen that the number of truncated sections can be increased to as many as necessary to provide the required uniformity. In addition, it can be seen that the required conical sections may be combined on a single side of the optical member, or may be divided between the two sides thereof.

It should be noted at this time, that although the performance of all of the members shown in FIGS. 9 through 12 are similar, that in the optical members 90 and 100 the respective cone angles become different from those shown in FIGS. 9 and 10. This is due to the fact that the second conical surfaces refract rays which reach the surface and are not collimated. Therefore, the angles of the refracting surfaces must be designed so that the combined deviation has the desired value in each zone.

It should be noted that it is desirable that the maximum intensity of the light in the various zones be substantially equal; however, it is within the scope of the invention to provide diffusing means of non-uniform characteristics to compensate for inequalities in zone intensities. Also, the non-uniform diffusing means may be combined with optical members having either equal or non-equal light intensities in the various zones to create intensity distributions of any predetermined form to fulfill special requirements. One ideal example of this type of system is when the invention is combined with a gas laser. Gas lasers, when operating in a single mode, emit an output beam having a Gausian intensity distribution. The present invention might be combined with a gas laser to provide a uniform intensity distribution.

Furthermore, the means for diffusing the zones has been described primarily as an etched or ground glass surface either on the truncated optical member or on a separate glass plate. While such a translucent surface is preferable, any other means of diffusing the light rays would also fall within the scope of the invention. For example, the means might be suspended in the glass. The means preferably should not, however, in any of the instances be a strong diffuser, although the use of such a diffuser is within the scope of the invention. This would serve only to defeat an objective of the invention, namely to utilize a maximum percentage of the output energy from the laser.

It is also within the scope of the invention to include optical members having an extremely shallow cone angle in lieu of the planar areas in the optical elements.

It is difficult to calculate the precise optimal cone angle $\alpha$ and diameter $d$ of the planar portion of a typical truncated conical optical member. The actual procedure used to obtain a 1.78° diffusion angle, measured from the axis, is as follows. The angle of the cone was calculated to give a deviation of 0.7 of the desired diffusion angle, i.e. $0.7 \times 1.78° = 1.25°$. For a glass having an index of refraction of 1.513, this set $\alpha = 2.44°$. Such a conical member was constructed and when combined with a weak diffuser, a test gave the pattern shown in FIG. 6(b). A small flat was then polished at the apex of the cone and the combination was retested. The pattern obtained was similar to FIG. 8(b) except that the relative intensities of the two zones were unequal. These steps were repeated until the intensity of the center zone equaled the intensity of the outer zone. At this time, the diameter of the flat was measured to be 1.85 mm, whereas the cone had an overall diameter of 6.8 mm. The flat then occupied 7.4 percent of the total area of the cone.

Figure 14:
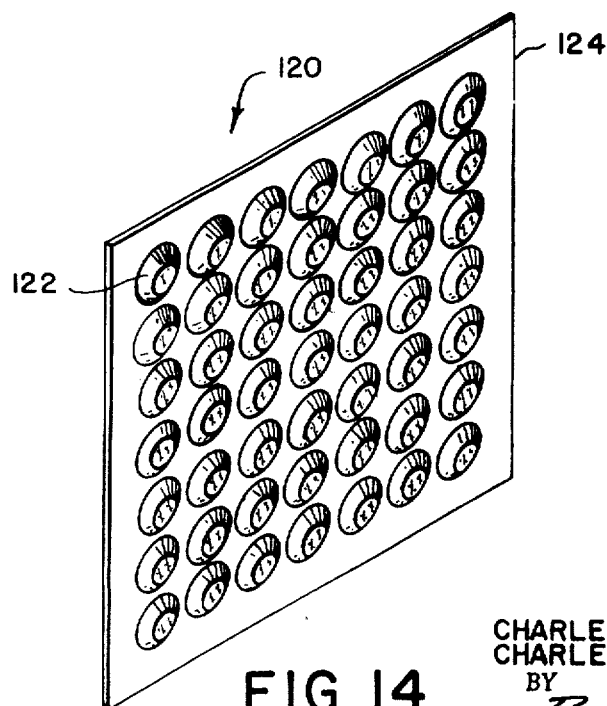
FIG. 14 is an isometric showing of another embodiment of the invention in which a plurality of closely spaced optical elements are formed on a sheet.

FIG. 14 shows another embodiment of the invention in which a diffuser 120 for a laser beam is shown which may totally destroy the spatial coherence of the laser beam without greatly degrading the overall intensity. A plurality of truncated conical optical surfaces 122 are formed in juxtaposition on a sheet of optical material 124. The optical elements 122 are located as close as possible to each other and the planar areas on the elements and the areas between the elements transmit the collimator light. However, the conical surfaces refract the light into divergent patterns which soon become intermixed so that when a diffusing surface is placed in the beam and the light is collected, the wavefronts are no longer distinguishable.

Figure 16:
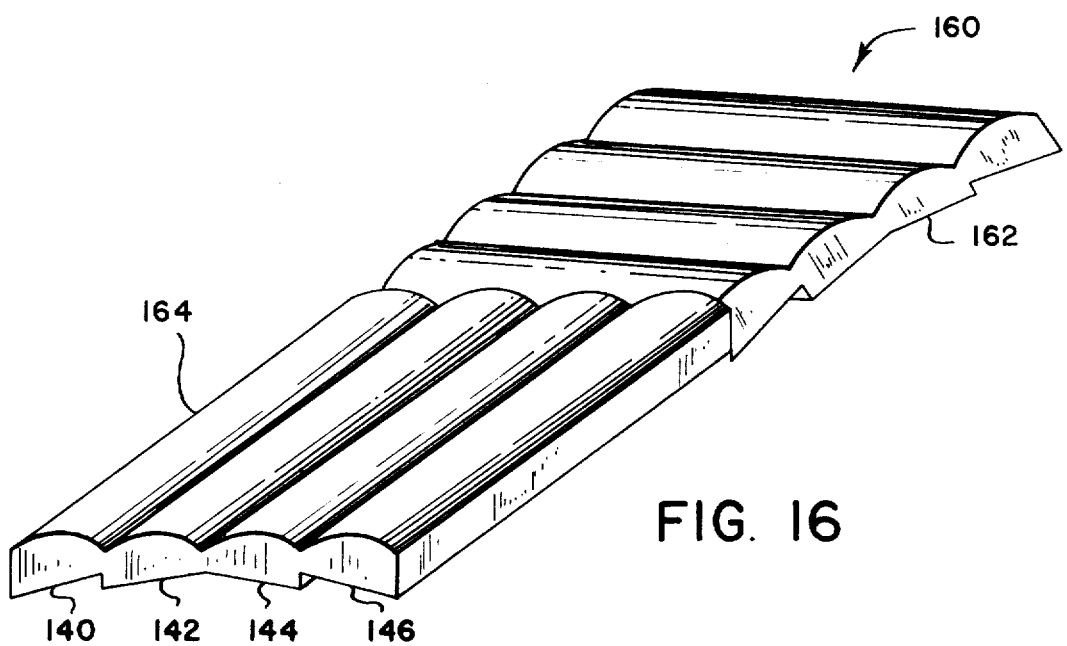
Figure 17:
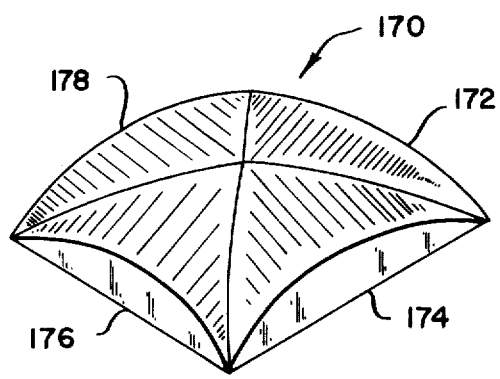

Proceeding now to a second group of optical elements which may be used according to the invention, these forms include cylindrical lenses and are shown in FIGS. 15 through 17. When cylindrical lenses are utilized, the pattern of the light intensities in the various zones becomes a pattern of straight lines rather than the circular lines formed by the conical elements.

In FIG. 15, there is shown an optical member 130 which is comprised of four cylindrical lenses 132, 134, 136, and 138. The number of lenses incorporated into the optical element is again the choice of the designer and depends upon the desired intensity distribution. Lenses 132 through 138 are shown as being identical optically; however, this is not necessary, but depends on the desired distribution. Optical wedges 140, 142, 144, and 146 are shown associated with the cylindrical lenses 132, 134, 136, and 138 respectively. The wedges serve to spread the output beam and may be used if desired.

The pattern of lines of maximum intensity at the field stop of the apparatus of FIG. 1 with the diffusing member removed is shown in FIG. 18 for the optical element 130. This pattern is formed of a series of parallel lines 148, 150, 152, and 154. With a diffusing member, the intensities would quite uniformly fill the aperture.

A similar optical member 160 is shown in FIG. 16, however, now two groups of cylindrical lenses 162 and 164 now split the aperture. The cylindrical axes of the lenses in each group are parallel to each other and coplanar with the cylindrical axes of the lenses in the other groups. The plane of the cylindrical axes is generally normal to the axis of the beam of the collimated light. The grid 166 of intensity maxima lines formed by the optical member 160 is shown in FIG. 19.

FIG. 17 shows an optical member 170 which has four cylindrical lenses 172, 174, 176, and 178 which form the pattern 180 of radial intensity maxima lines shown in FIG. 20. In this optical member, the axes of the cylindrical lenses lie on the surface of a cone rather than in a plane. This again causes an amount of controlled divergence in the beam.

While there have been shown and described what are considered to be preferred embodiments of the present invention, it will be obvious to those skilled in the art that various changes and modifications in addition to these set forth may be made therein without departing from the spirit of the invention.

We claim:

1. A controlled optical beam forming device comprising:
    means for optically apportioning the light in a substantially collimated beam of light into a plurality of extensive zones, and
    means for diffusing the light in the zones to form an emergent beam,
    the emergent beam having controlled intensity and divergency distribution, the relative positions of the plurality of extensive zones controlling the divergency of the emergent beam, and the relative intensities of the plurality of extensive zones and the means for diffusing controlling the intensity distribution of the emergent beam.

2. A device according to claim 1, in which the means for optically apportioning the collimated light includes at least one truncated conical surface disposed coaxially with the collimated beam of light.

3. A device according to claim 1, in which the means for optically apportioning the collimated light includes a plurality of cylindrical lenses disposed in and transverse to the collimated beam of light.

4. A device according to claim 3, in which the plurality of cylindrical lenses are oriented with their cylindrical axes parallel and lying normal to the collimated light beam so that a like plurality of parallel linear zones are formed.

5. A device according to claim 4, in which refracting optical wedges are associated with at least a portion of the cylindrical lenses, each refracting optical wedge having a face thereof which is essentially coextensive in the beam of light with the associated cylindrical lens.

6. A device according to claim 3, in which the cylindrical lenses are divided into a plurality of groups containing at least one cylindrical lens each, the cylindrical axes of the lenses in each group being parallel to each other, the plurality of groups being located so as to split the collimated beam of light therebetween to form a pattern of zones which is a function of the relative orientation of the cylindrical axes of the cylindrical lenses.

7. A device according to claim 6, in which there are two groups of cylindrical lenses having their axes normal to each other and which form a grid pattern of zones.

8. A device according to claim 6, in which the groups include a single lens each and the lenses are arranged with their cylindrical axes disposed radially from the axis of the beam to form a radial pattern of zones.

9. A controlled optical beam forming device for distributing light from a collimated source within a controlled solid angle and having a controlled intensity distribution within the solid angle, the device comprising
    an optical member having an entrance face and an exit face at least one truncated conical surface on at least one face thereof for apportioning the collimated beam of light from the source into a plurality of concentric zones within the solid angle, and
    means for diffusing the light in the zones to form an emergent beam within the solid angle having the controlled intensity distribution.

10. A device according to claim 9, in which the desired intensity distribution within the solid angle is substantially uniform.

11. A device according to claim 10, in which the relative intensities of the light in the concentric zones are approximately equal.

12. A device according to claim 10, in which the relative intensities of the light in the concentric zones are unequal and the means for diffusing comprises a diffuser having characteristics which are complementary to the relative intensities in the zones so that substantially uniform intensity is provided across the solid angle.

13. A device according to claim 9, in which the optical member has a surface which is formed of a plurality of truncated conical surface sections each having successively smaller cone angles and the major diameter of each succeeding truncated conical surface section being equal to the minor diameter of the preceding section.

14. A device according to claim 13, in which there are two truncated conical surface sections.

15. A device according to claim 14, in which the truncated conical surface sections are convex.

16. A device according to claim 14, in which the truncated conical surface sections are concave.

17. A device according to claim 9, in which at least one truncated conical surface is formed on each face of the optical member.

18. A device according to claim 9, in which a truncated conical surface is formed on each face of the optical member.

19. A device according to claim 9, in which the collimated source is a laser.

20. A device according to claim 19, in which the laser is a gas laser.

21. A controlled optical beam forming device for a laser photocoagulator for substantially uniformly distributing the collimated beam of light emitted by the laser within a controlled solid angle, the device comprising
    a truncated conical optical member for apportioning the beam of collimated light into two concentric zones of approximately equal maximum intensity within the solid angle, the axis of the truncated conical optical member being substantially parallel to the collimated beam of light emitted by the laser, the first zone comprising a collimated beam surrounding the conical axis and emerging from the planar portions of the truncated conical optical element, the second zone comprising light emerging from the conical portion of the truncated conical optical element and being a divergent annular beam around the first zone, the angle of divergence being a function of the cone angle of the truncated conical optical element, and
    a translucent surface for diffusing the intensities of the light in the zones to form a nominally uniform distribution of light within the solid angle.

22. A device according to claim 21, in which the translucent surface is an etched glass surface.

23. A device according to claim 22, in which the etched glass surface is a surface of the truncated conical optical element.

24. A device for uniformly diffusing a collimated beam of light comprising an essentially planar array of juxtaposed optical elements disposed in and transverse to the collimated beam of light, each optical element comprising a means for optically apportioning the collimated beam of light into a plurality of extensive zones, and means for diffusing the light in the zones to form a uniformly diffused beam of light.

* * * * *